United States Patent [19]

Gruber

[11] Patent Number: 5,664,755
[45] Date of Patent: Sep. 9, 1997

[54] INTERLOCKING SEAT ADJUSTER WITH COMPENSATING LINK

[75] Inventor: Rudolf Gruber, Claremont, Canada

[73] Assignee: Multimatic Inc., Markham, Canada

[21] Appl. No.: 199,272

[22] PCT Filed: Feb. 12, 1993

[86] PCT No.: PCT/CA93/00058

§ 371 Date: Feb. 28, 1994

§ 102(e) Date: Feb. 28, 1994

[87] PCT Pub. No.: WO94/00313

PCT Pub. Date: Jan. 6, 1994

Related U.S. Application Data

[63] Continuation-in-part of Ser. No. 906,329, Jun. 30, 1992, abandoned.

[30] Foreign Application Priority Data

Jun. 30, 1992 [CA] Canada .................. 2072809

[51] Int. Cl.⁶ ................................................ F16M 13/00
[52] U.S. Cl. ............................ 248/424; 248/419; 248/421
[58] Field of Search ............................ 248/424, 421, 248/419, 423, 416

[56] References Cited

U.S. PATENT DOCUMENTS

| | | | |
|---|---|---|---|
| 2,919,744 | 1/1960 | Tanaka | 248/419 |
| 2,942,647 | 6/1960 | Pickles | 155/14 |
| 2,980,163 | 4/1961 | Pickles | 155/14 |
| 2,983,307 | 5/1961 | Meyer | 248/419 |
| 3,006,594 | 10/1961 | Gruendler | 248/424 |
| 3,022,035 | 2/1962 | Pickles | 248/395 |
| 3,037,735 | 6/1962 | Matthews | 248/394 |
| 3,136,524 | 6/1964 | Pickles | 248/424 |
| 3,149,815 | 9/1964 | Cotter et al. | 248/421 |
| 4,422,611 | 12/1983 | Kitsuda | 248/421 |
| 4,643,383 | 2/1987 | Fukuta et al. | 248/421 |
| 4,940,285 | 7/1990 | Suzuki et al. | 297/473 |

FOREIGN PATENT DOCUMENTS 3643729  7/1988  Germany.

Primary Examiner—Derek J. Berger
Assistant Examiner—Anita M. King
Attorney, Agent, or Firm—Neil H. Hughes

[57] ABSTRACT

A seat bracket and riser for a seat system includes interlocking portion which create a direct path for the resolution of any forces thereupon to the frame whiler reducing loads passing to the operating portions of the seat system.

In a preferred embodiment the seat adjuster including a system of linkages utilizing the effect of a compensating member or the like which compensates for the arcuate motion of the system if left uncompensated. The invention finds particular application for compact assemblies.

10 Claims, 9 Drawing Sheets

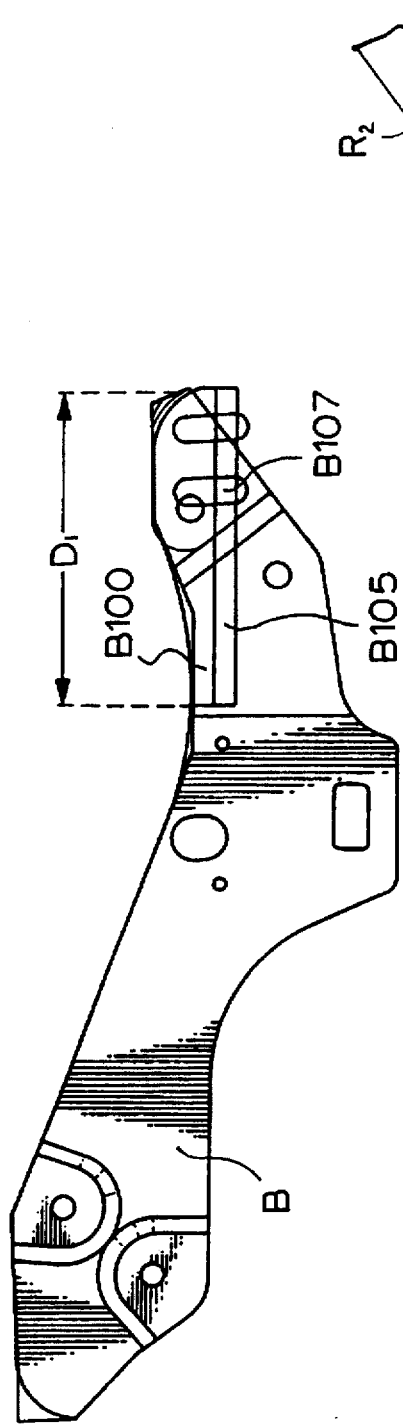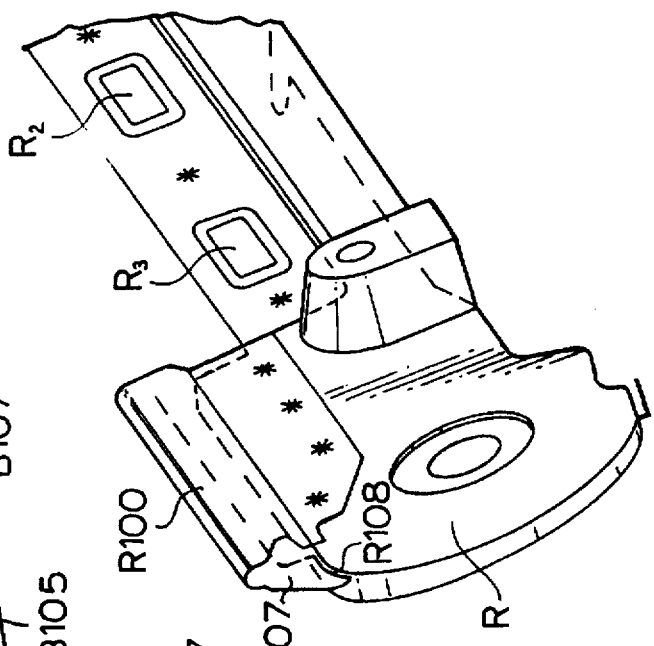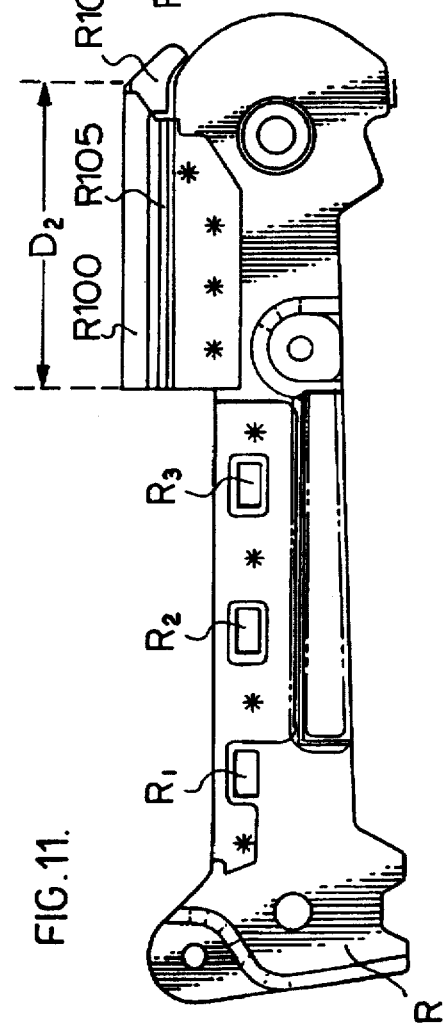
FIG. 10.
FIG. 11.
FIG. 12.

INTERLOCKING SEAT ADJUSTER WITH COMPENSATING LINK

This is a continuation-in-part application of U.S. patent application Ser. No. 07/906,329, filed Jun. 30, 1992, now abandoned.

BACKGROUND OF THE INVENTION

Field of Invention

This invention relates to mechanisms for moving a seat bracket and the seat attached forward and backwards in relation to a frame. Specifically this invention finds application in seats for a vehicle.

A multitude of devices are known in the prior art for moving vehicle seats fore and aft in relation to a frame of a vehicle. Most of the assemblies found in the prior art relate to seat tracks upon which the seat bracket and the seat attached thereto are releasably moveable. However these assemblies are heavy in construction and add to the weight of the vehicle unnecessarily.

Further there exists a number of devices for the movement of a seat which generally do not rely on rails to provide the fore and aft movement of the seat but provide pivotable members attached to the seat bracket to move the seat in relation to the frame. Examples of such assemblies are described below.

U.S. Pat. No. 4,807,932 issued on Feb. 28, 1989 to Kia Motors describes a device for moving an automobile seat back and forth including legs pivotable to the frame which moves the seat along an arcuate path.

U.S. Pat. No. 4,121,802 issued on Oct. 24, 1978 to Keiper KG describes a device as illustrated in relation to FIG. 2 including a linkage operative for vertical movement of the carrier in relation to a base.

PCT Application WO 91/04881 published on Apr. 18, 1991 describes the parallel motion between a seat and a support frame which includes a system of links.

West German Patent Application 4,010,451 published on Oct. 2, 1991 and Assigned to Audi describes the longitudinal motion of a seat by means of a four bar linkage system. The motion of the seat is clearly arcuate as seen in the figures.

Finally, West German Patent Application 2,855,293 published on Jul. 3, 1980 to Fichtel & Sachs AG describes a multi-link adjustment member for a seat which purports to provide generally linear motion of the seat.

Nowhere within the prior art is there found a preferably compact adjustment mechanism for a seat which includes a linkage system including a compensating link to compensate for the arcuate motion of the primary links of the mechanism rendering the final longitudinal motion of the seat as substantially linear within the range of motion of the seat.

It is therefore an object of this invention to provide a seat adjustment mechanism which includes a linkage system moveable within the limits of motion of the seat to a predetermined number of positions wherein the linkage system includes a compensating link to compensate for the arcuate motion of the primary links of the mechanism, during the for and aft movement of the seat, rendering the final longitudinal motion of the seat as substantially linear within the range of motion of the seat. It is particularly advantageous to provide a compact design to minimize the space required for the installation of the assembly.

It is another object of this invention to provide a mechanism which operates silently and requires little lubrication.

It is a further object of the invention to provide a seat adjuster which is lightweight compact and economical to manufacture.

It is a requirement for seats systems that they meet certain minimum requirements such as those found in the FMVSS in the United States and specifically standard numbers 207 and 210. It has therefore been found to be advantageous in order to meet these standards and surpass them to further enhance the aforementioned seat adjustment mechanism with means to interlock a seat bracket with a riser in the compact seat adjustment mechanism for a seat, to provide reinforcement for the link system.

In conducting such tests as described in FMVSS 207 and 210 and when the finished product includes brackets which are manufactured from sheet metal 3 mm thick, and links which are 5 mm thick and pins which have 16 mm diameter it has been found that the loading on the seat structure during the test, as the load is passed to ground it passes from the seat bolt to the link and the adjustment latch and then to the riser and then from the riser to the latches to ground. Therefore in testing it has been found the seat system has deformed extensively so that it does not meet FMVSS requirements. It would therefore be advantageous to provide within the seat system means for limiting deformation.

It is therefore an object of a preferred embodiment of the invention to provide a direct path within the seat system by design for resolution of the forces exerted upon the seat system so as to minimize the damage to the operating components of the seat system.

It is a further object of this invention to provide a seat system which is safer for public use.

Further and other objects of this invention will become apparent to one skilled in the art when considering the following summary of the invention and the more detailed description of the preferred embodiment illustrated herein.

SUMMARY OF THE INVENTION

To these ends according to a primary aspect of the invention there is provided a seat adjuster for longitudinal fore and aft adjustment of a seat in relation to a stationary frame comprising a linkage system for providing the longitudinal movement of the seat including at least two links for moving the seat fore and aft and at least one compensating means such as a link for compensating for the substantially arcuate motion of the at least two links of the linkage system of the seat, the cooperative motion of the at least one compensating means such as a link rendering the movement of the linkage system and the seat as substantially linear within the range of movement of the seat. For example the top ends of the at least two links in use move in an arcuate upward and forward motion during the forward motion of the seat, and in an arcuate downward and rearward motion during the rearward movement of the seat. To compensate for this arcuate motion, which would alter the head room of an occupant if uncompensated for as the seat is moved within its range of longitudinal motion, the compensating link moves in a downward and forward compensating arcuate motion during the forward movement of the seat and in an upward and rearward compensating arcuate motion during the rearward movement of the seat thereby compensating for the motion of the at least two links and rendering the motion of the seat in relation to the stationary frame by maintaining the seat in a substantially constant parallel position with respect to the frame throughout the range of movement of said seat so that there is no appreciable arcuate movement but a substantially linear movement of said seat in relation to the frame.

According to another aspect of the invention there is provided a seat adjustment mechanism for the longitudinal motion of a seat bracket, having the seat disposed therewith in use, in relation to a stationary frame member of a vehicle, the seat adjuster mechanism comprising a linkage system moveable, for example pivotable, within the limits of motion of the seat to and from a predetermined number of positions, the linkage system including at least two primary links which provide as they move with respect to the frame the longitudinal motion of the seat bracket in relation to the frame, and a compensating link to compensate for the substantially arcuate motion of the at least two primary links of the mechanism during the fore and aft movement of the seat, rendering the final longitudinal motion of the seat as substantially linear within the range of motion of the seat.

According to yet another aspect of the invention there is provide a system for providing linear movement of a vehicle seat comprising a seat bracket, having a seat disposed therewith in use, and a riser, each of the seat bracket and the riser having a front and rear, top and bottom; the seat bracket being located substantially on top of said riser in use; at least two first links pivotally engaged with said seat bracket, one of said at least two first links being connected proximate the front of the seat bracket and the other of said at least two first links being connected proximate the rear of said seat bracket; at least two second longer links, being longer than said first links, and pivotally engaged with said seat bracket, one of said at least two second links being pivotally connected proximate the front of said seat bracket but offset towards the rear and towards the top of the seat bracket in relation to the pivot of the first link, and the other of said at least two second links being pivotally connected proximate the rear of said seat bracket but offset towards the rear and towards the top of the seat bracket in relation to the pivot of the first link, said at least two first and second links being pivotally interconnected with at least two compensating third links pivotably connected with the front and rear of the riser, the at least two first links being interconnected with the at least two compensating third links proximate the free end of the at least two third compensating links respectively, the at least two second links being interconnected with the at least two compensating third links intermediate the free ends of the at least two compensating third links and pivoting the end of the at least two compensating third links connected with the riser respectively, the at least two first and second links providing the longitudinal fore and aft motion of seat bracket in relation to the riser, the at least two compensating third links compensating for the arcuate motion of the at least two first and second links maintaining the seat bracket in a substantially constant parallel position with respect to the riser throughout the range of movement of said seat bracket so that there is no appreciable arcuate movement but a substantially linear movement of said seat bracket in relation to the riser.

For example the top ends of the at least two first and second links in use move in an arcuate upward and forward motion during the forward motion of the seat, and in an arcuate downward and rearward motion during the rearward movement of the seat. To compensate for this arcuate motion, which would alter the head room of an occupant if uncompensated for as the seat is moved within its range of longitudinal motion, the at least two compensating third links move in a downward and forward compensating arcuate motion during the forward movement of the seat and in an upward and rearward compensating arcuate motion during the rearward movement of the seat thereby compensating for the motion of the at least two first and second links and rendering the motion of the seat bracket in relation to the frame by maintaining the seat bracket in a substantially constant parallel position with respect to the riser throughout the range of movement of said seat bracket so that there is no appreciable arcuate movement but a substantially linear movement of said seat bracket in relation to the riser.

In a preferred embodiment of the invention of any of the above mentioned embodiments the riser may further comprise integral detent portions (for example cutouts or windows) disposed proximate the top thereof to fasten the seat bracket in relation to the riser at various detent positions in relation thereto, the seat bracket including latching means (for example a resiliently biased moveable pawl) which releasably engages the latching portions of the riser as the seat is moved to and from alternative comfort positions. Preferably the seat bracket and or the riser may further comprise portions disposed proximate the bottom of the seat bracket and or the top of the riser which engages with one another and provide resistance to lateral forces tending to move the bracket laterally in relation to the riser and assist in guiding the bracket in relation to the riser longitudinally. In a preferred embodiment the portions are downwardly extending flanges of the seat bracket which surround the top of the riser and further assist in guiding the longitudinal motion of the seat bracket in relation to the riser, preferably the latching means when latched simultaneously extending through openings in the riser and aligned opening extending through the seat bracket.

In another preferred embodiment the riser may further comprise integral latching portions proximate the bottom thereof to fasten the riser, the seat bracket and the seat in use to floor latching portions (for example strikers recessed in the floor of the vehicle).

Those skilled in the art will appreciate that many modifications can be made to the seat adjuster described herein. Any system of linkages used as a seat adjuster utilizing the effect of a compensating member or the like which compensates for the arcuate motion of the system if left uncompensated would fall within the scope of this invention.

According to yet another aspect of the invention there is provided a seat system comprising a vehicle frame and a seat bracket moveably affixed in relation to said frame, the seat system having means to move the seat bracket to and from a fore and aft position longitudinally in relation to said frame, the frame having first interlocking means to interlock with interlocking means of the seat bracket over the longitudinal motion of the seat bracket, the seat bracket having second interlocking means to interlock with interlocking means of the frame over the longitudinal motion of the seat bracket, wherein the first and second interlocking means cooperatively provide a direct path to the vehicle frame for any forces exerted upon the seat system during an accident while minimizing any forces exerted on the means to move the seat bracket to and from a fore and aft position in relation to the frame, during the accident.

According to yet still another aspect of the invention there is provided a seat system comprising a riser attached to a vehicle frame and a seat bracket moveably affixed in relation to said riser, the seat system having means to move the seat bracket to and from a fore and aft position longitudinally in relation to said riser, the riser having first interlocking means (for example hook portions welded to said riser and extending upwardly away from said riser with the mouth of the hooking portion pointing in a substantially downward direction) to interlock with interlocking means of the seat bracket over the longitudinal motion of the seat bracket, the seat bracket having second interlocking means (for example hook portions welded to said seat bracket and extending downwardly away from said seat bracket with the mouth of the hooking portion pointing in a substantially upward direction) to interlock with interlocking means of the riser over the longitudinal motion of the seat bracket, wherein the first and second interlocking means cooperatively provide a direct path to the vehicle frame for any forces exerted upon the seat system during an accident while minimizing any forces exerted on the means to move the seat bracket to and from a fore and aft position in relation to the riser, during the accident. Preferably the interlocking means are disposed proximate the rear of the riser and seat bracket only, and in one embodiment only extend the distance between the most rearward two comfort positions. In another embodiment the interlocking means of the riser and the seat bracket are reinforced in the positions of the determined greatest exerted load which preferably is proximate the rear of the seat system.

In a preferred embodiment the seat system having the means to move the seat bracket to and from a fore and aft position longitudinally in relation to said riser may further comprise a linkage system for providing the longitudinal movement of the seat bracket including at least two links for moving the seat bracket fore and aft and at least one compensating means for compensating for the substantially arcuate motion of the at least two links of the linkage system of the seat bracket, the cooperative motion of the at least one compensating means rendering the movement of the linkage system and the seat bracket as substantially linear within the range of movement of the seat bracket. Preferably the at least two links in use move in an arcuate upward and forward motion during the forward motion of the seat bracket, and in an arcuate downward and rearward motion during the rearward movement of the seat bracket and to compensate for this arcuate motion, which would alter the head room of an occupant if uncompensated for as the seat bracket is moved within its range of longitudinal motion, the compensating means being a link moves in a downward and forward compensating arcuate motion during the forward movement of the seat bracket and in an upward and rearward compensating arcuate motion during the rearward movement of the seat bracket thereby compensating for the motion of the at least two links and rendering the motion of the seat bracket in relation to the stationary frame by maintaining the seat bracket in a substantially constant parallel position with respect to the frame throughout the range of movement of said seat bracket so that there is no appreciable arcuate movement but a substantially linear movement of said seat bracket in relation to the frame.

In a preferred embodiment said means to move the seat bracket to and from a fore and aft position longitudinally in relation to said riser may further comprise a seat adjuster mechanism comprising a linkage system moveable, for example pivotable, within the limits of motion of the seat bracket to and from a predetermined number of positions, the linkage system including at least two primary links which provide as they move with respect to the frame the longitudinal motion of the seat bracket in relation to the frame, and a compensating link to compensate for the substantially arcuate motion of the at least two primary links of the mechanism during the fore and aft movement of the seat bracket, rendering the final longitudinal motion of the seat bracket as substantially linear within the range of motion of the seat.

In another preferred embodiment said means to move the seat bracket to and from a fore and aft position longitudinally in relation to said riser may further comprise a system of linkages utilizing the effect of a compensating member or the like which compensates for the arcuate motion of the system if left uncompensated.

According to yet another aspect of the invention there is provided a system for providing linear movement of a vehicle seat comprising a seat bracket, having a seat disposed therewith in use, and a riser, each of the seat bracket and the riser having a front and rear, top and bottom; the seat bracket being located substantially on top of said riser in use; at least two first links pivotally engaged with said seat bracket, one of said at least two first links being connected proximate the front of the seat bracket and the other of said at least two first links being connected proximate the rear of said seat bracket; at least two second longer links, being longer than said first links, and pivotally engaged with said seat bracket, one of said at least two second links being pivotally connected proximate the front of said seat bracket but offset towards the rear and towards the top of the seat bracket in relation to the pivot of the first link, and the other of said at least two second links being pivotally connected proximate the rear of said seat bracket but offset towards the front and towards the top of the seat bracket in relation to the pivot of the first link, said at least two first and second links being pivotally interconnected with at least two compensating third links pivotably connected with the front and rear of the riser, the at least two first links being interconnected with the at least two compensating third links proximate the free end of the at least two compensating third links respectively, the at least two second links being interconnected with the at least two compensating third links intermediate the free ends of the at least two compensating third links and pivoting ends of the at least two compensating third links connected with the riser respectively, the at least two first and second links providing the longitudinal fore and aft motion of seat bracket in relation to the riser, the at least two compensating third links compensating for the arcuate motion of the at least two first and second links maintaining the seat bracket in a substantially constant parallel position with respect to the riser throughout the range of movement of said seat bracket so that there is no appreciable arcuate movement but a substantially linear movement of said seat bracket in relation to the riser, the riser having first interlocking means to interlock with interlocking means of the seat bracket over the longitudinal motion of the seat bracket, the seat bracket having second interlocking means to interlock with interlocking means of the riser over the longitudinal motion of the seat bracket, wherein the first and second interlocking means cooperatively provide a direct path to the vehicle frame for any forces exerted upon the seat system during an accident while minimizing any forces exerted on said first, second, and compensating links during the accident.

Preferably the top ends of the at least two first and second links in use move in an arcuate upward and forward motion during the forward motion of the seat, and in an arcuate downward and rearward motion during the rearward movement of the seat; to compensate for this arcuate motion, which would alter the head room of an occupant if uncompensated for as the seat is moved within its range of longitudinal motion, the at least two compensating third links move in a downward and forward compensating arcuate motion during the forward movement of the seat and in an upward and rearward compensating arcuate motion during the rearward movement of the seat thereby compensating for the motion of the at least two first and second links and rendering the motion of the seat bracket in relation to the frame by maintaining the seat bracket in a substantially constant parallel position with respect to the riser throughout the range of movement of said seat bracket so that there is no appreciable arcuate movement but a substantially linear movement of said seat bracket in relation to the riser. Preferably the riser may further comprises integral detent portions (for example cutouts or windows) disposed proximate the top thereof to fasten the seat bracket in relation to the riser at various detent positions in relation thereto, the seat bracket including latching means (for example a resiliently biased moveable pawl) which releasably engages the latching portions of the riser as the seat is moved to and from alternative comfort positions.

Preferably the seat bracket and or the riser may further comprises portions disposed proximate the bottom of the seat bracket and or the top of the riser which engages with one another and provide resistance to lateral forces tending to move the bracket laterally in relation to the riser and assist in guiding the bracket in relation to the riser longitudinally. In one embodiment the portions are downwardly extending flanges of the seat bracket which surround the top of the riser and further assist in guiding the longitudinal motion of the seat bracket in relation to the riser. In another embodiment the latching means when latched simultaneously extending through openings in the riser and aligned opening extending through the seat bracket. Preferably the riser further comprises integral latching portions proximate the bottom thereof to fasten the riser, the seat bracket and the seat in use to floor latching portions (for example strikers recessed in the floor of the vehicle).

BRIEF DESCRIPTION OF THE DRAWINGS

The invention will now be illustrated with respect to the following drawings illustrating embodiments of the invention in which:

FIG. 10 is a schematic side view which illustrates the seat bracket B including the interlocking portion thereof proximate the rear thereof and illustrated in a preferred embodiment of the invention.

FIG. 11 is a schematic side view which illustrates the seat riser including the interlock component R100 illustrated in a preferred embodiment of the invention.

FIG. 12 is a perspective view of the end of the riser proximate the interlocking portion R100 illustrated in a preferred embodiment of the invention.

DETAILED DESCRIPTION OF PREFERRED EMBODIMENTS OF THE INVENTION

Figure 1:
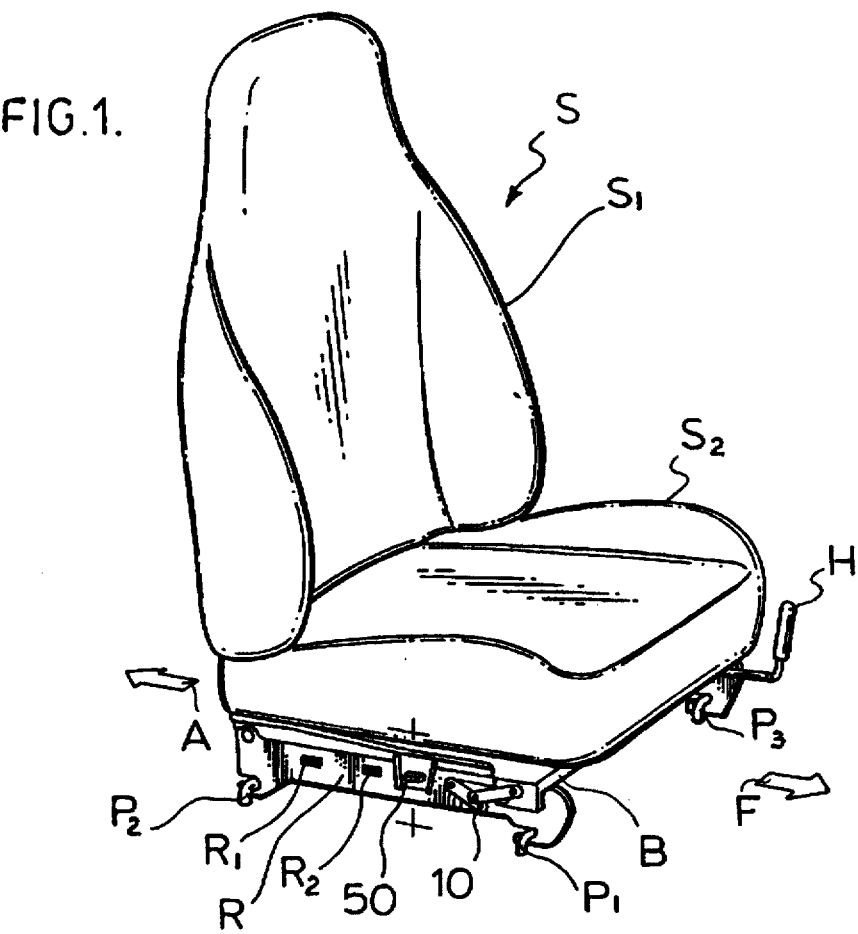
FIG. 1 is a perspective view of a preferred embodiment of the invention installed upon a vehicle.

Referring now to FIG. 1, there is illustrated in perspective view a vehicle seat S including a seat back S1 and a seat S2. The seat S2 is attached to a seat bracket B which is pivotably engaged with a riser R anchored to the floor of a vehicle. As is the convention with removeable seats for a truck or van, pins P1 and P2 are provided for the latching, via latch mechanisms L1 and L2, of the riser R and therefor the seat S2 to the vehicle. The pins or strikers P1 and P2 are often recessed within opening or wells provided with the floor of a vehicle such as a van.

A seat adjuster 10 is provided at the front and rear and on both sides of the seat S2, to provide the longitudinal fore and aft motion of the seat S2 in relation to the stationary riser R in the directions F and A respectively. A resiliently biased latching mechanism 50, operative via handle H, in cooperation with openings B1 of the seat bracket and R1, R2 and R3 provided with the riser allow for the motion of the seat to and from these predefined comfort positions.

Figure 2:
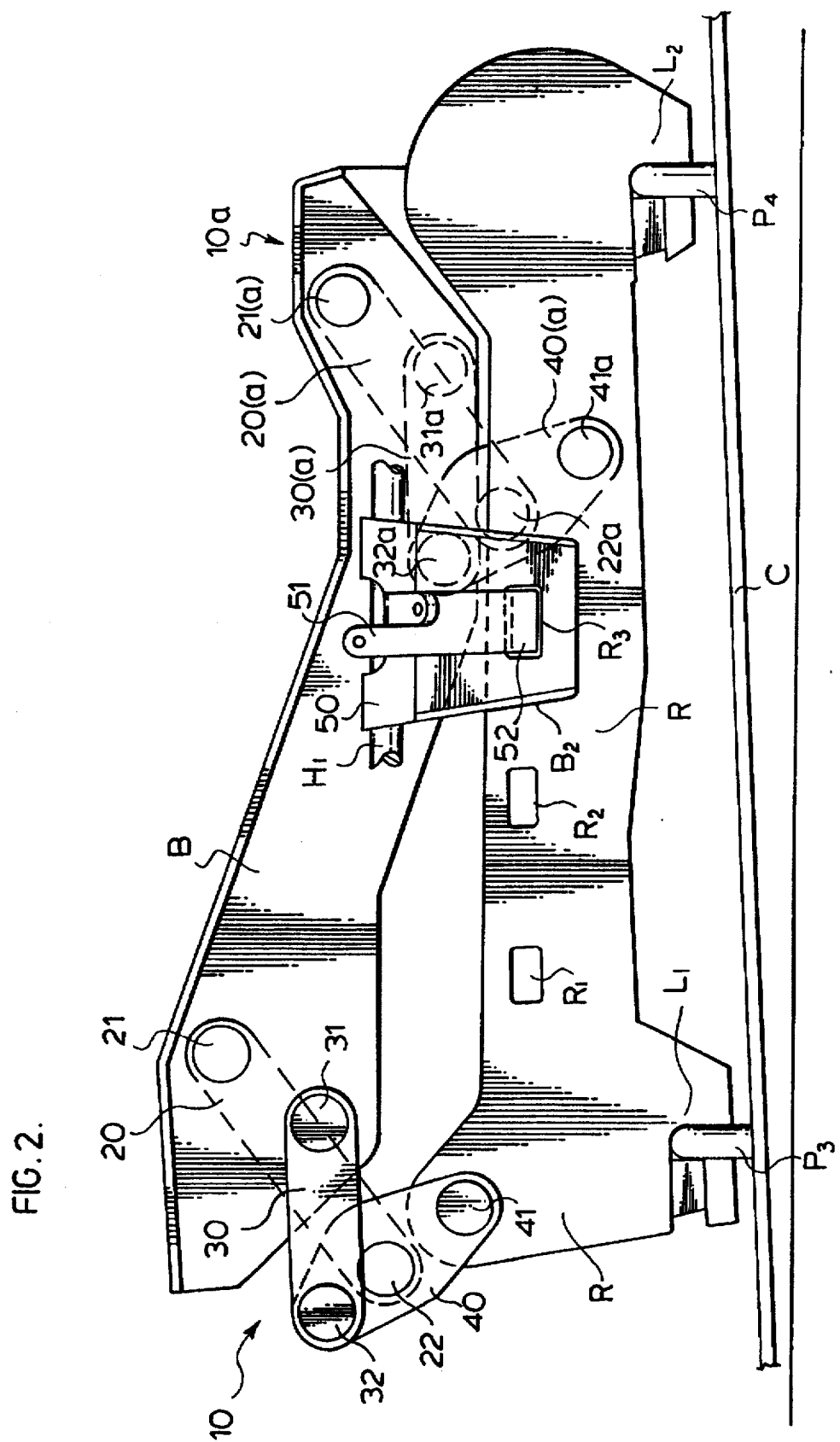
FIG. 2 is a side plan view of the seat adjuster of FIG. 1 illustrated in a preferred embodiment of the invention.
Figure 3:
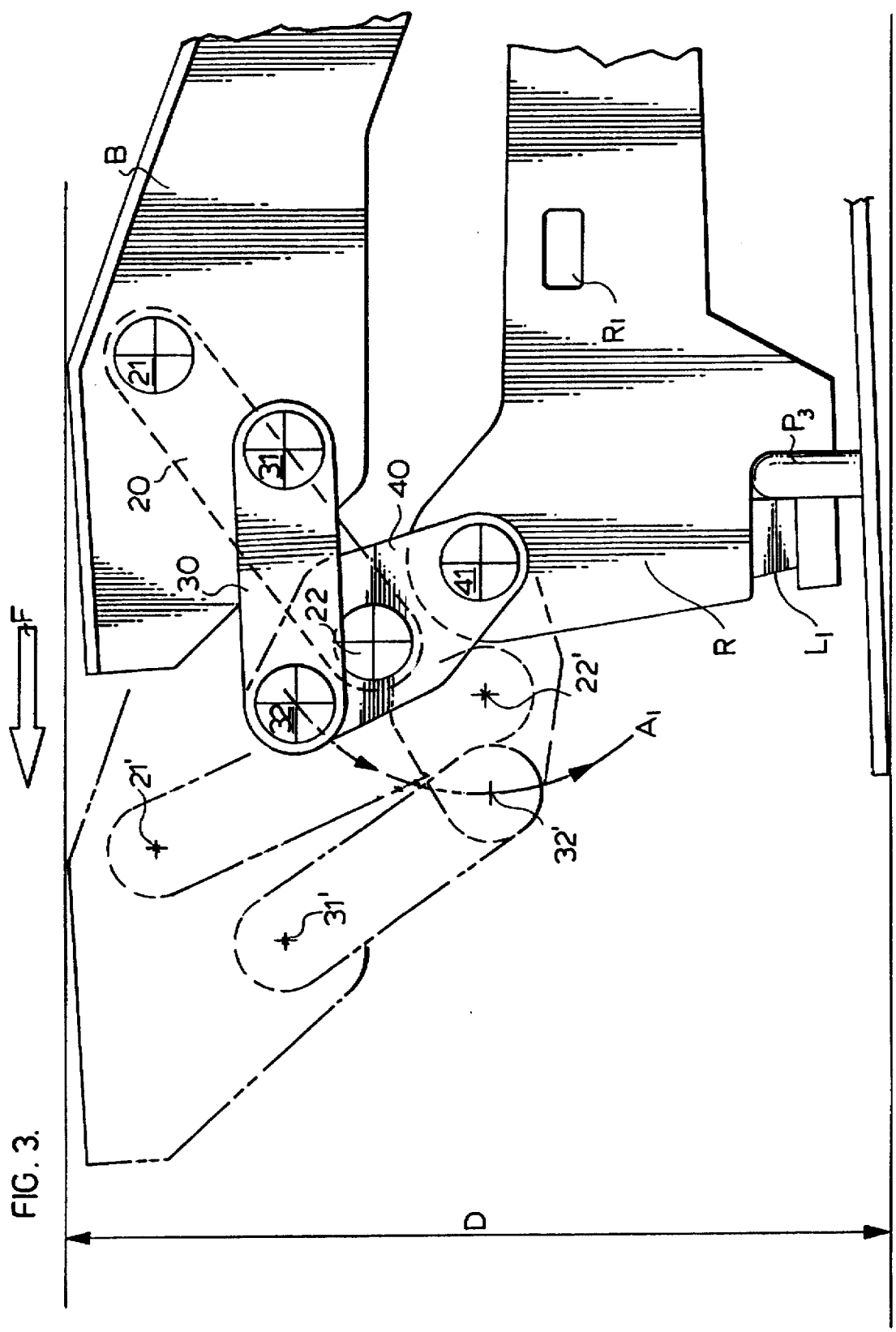
FIG. 3 is a schematic view of the front end of the seat adjuster of FIG. 2 illustrated in a preferred embodiment of the invention.
Figure 4:
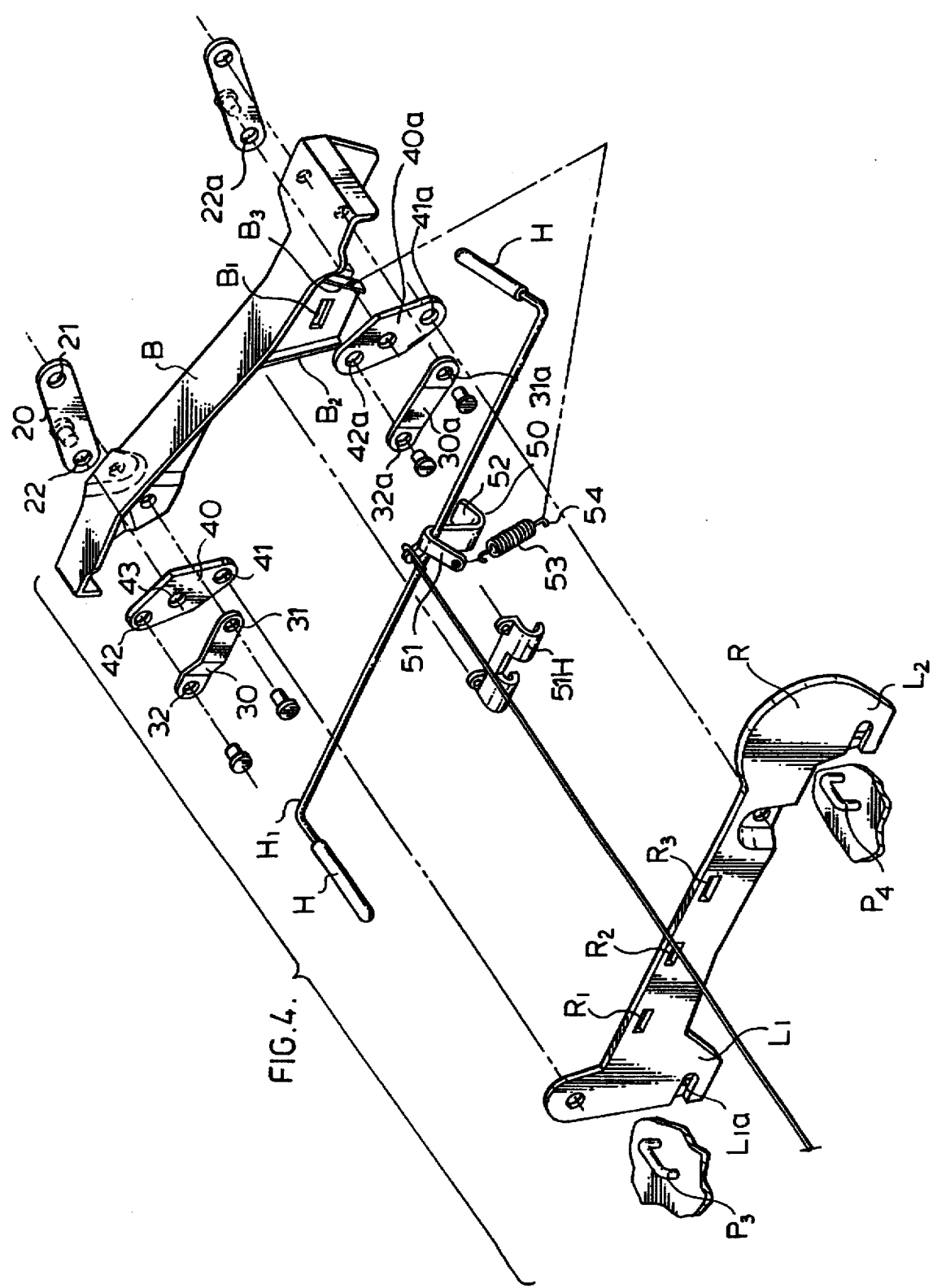
FIG. 4 is an exploded perspective view of the mechanism of FIG. 2 illustrated in a preferred embodiment of the invention.
Figure 5:
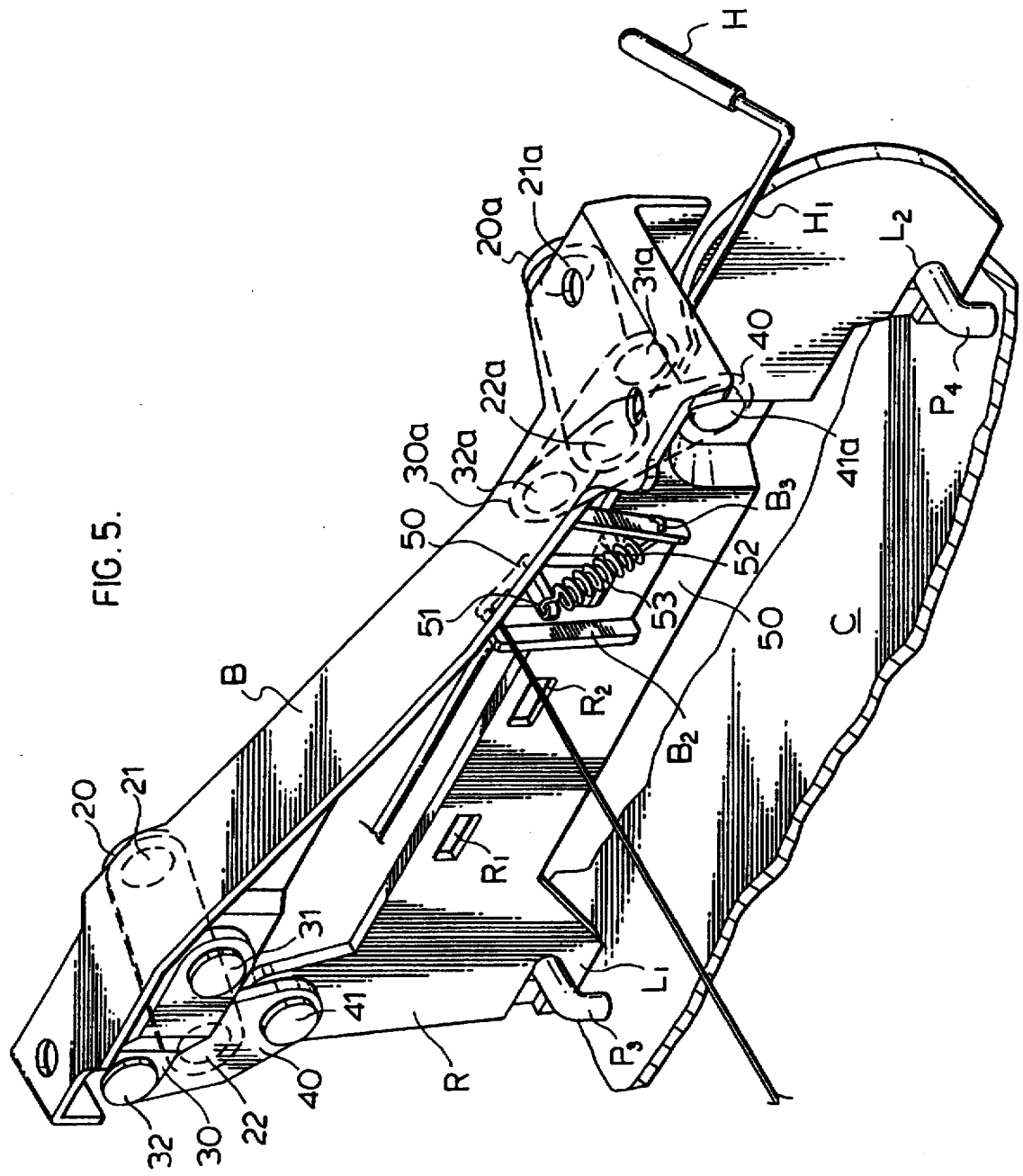
FIG. 5 is a perspective view of the mechanism of FIG. 2 and illustrated in a preferred embodiment of the invention.

Referring now to FIGS. 2 and 3, illustrated in side plan view, FIG. 4, illustrated in exploded perspective view and FIG. 5, illustrated in perspective, the mechanisms 10 and 10a disposed proximate the front and rear of the seat bracket B provide for the substantially linear movement thereof with respect to the riser R via the cooperative pivotal operation of the links 20, 30, and 40 and 20a, 30a, and 40a. The links 40 and 40a pivot from the riser R at pivots 41 and 41a. The links 20 and 20a pivot from the seat bracket B at 21 and 21a respectively and from proximate the center 22 and 22a of link 40 and 40a. The links 30 and 30a pivot from the seat bracket B at 31 and 31a respectively and from proximate the free ends 32 and 32a of link 40 and 40a.

Figure 7:
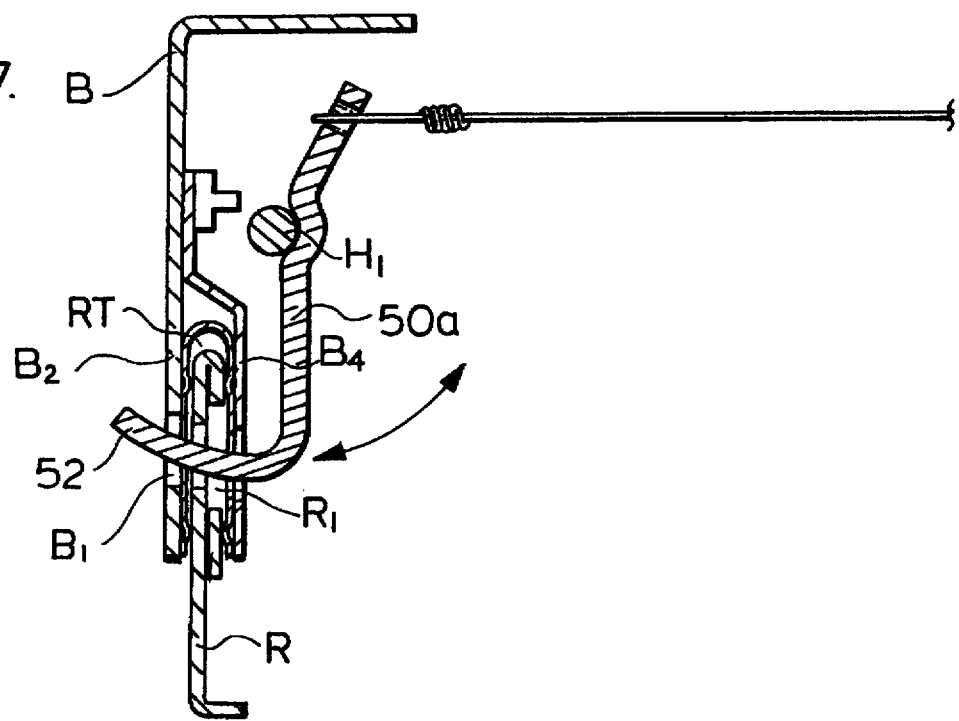
FIG. 7 is a front plan view of the latching mechanism 50 of FIG. 2 illustrated in a preferred embodiment of the invention.
Figure 6:
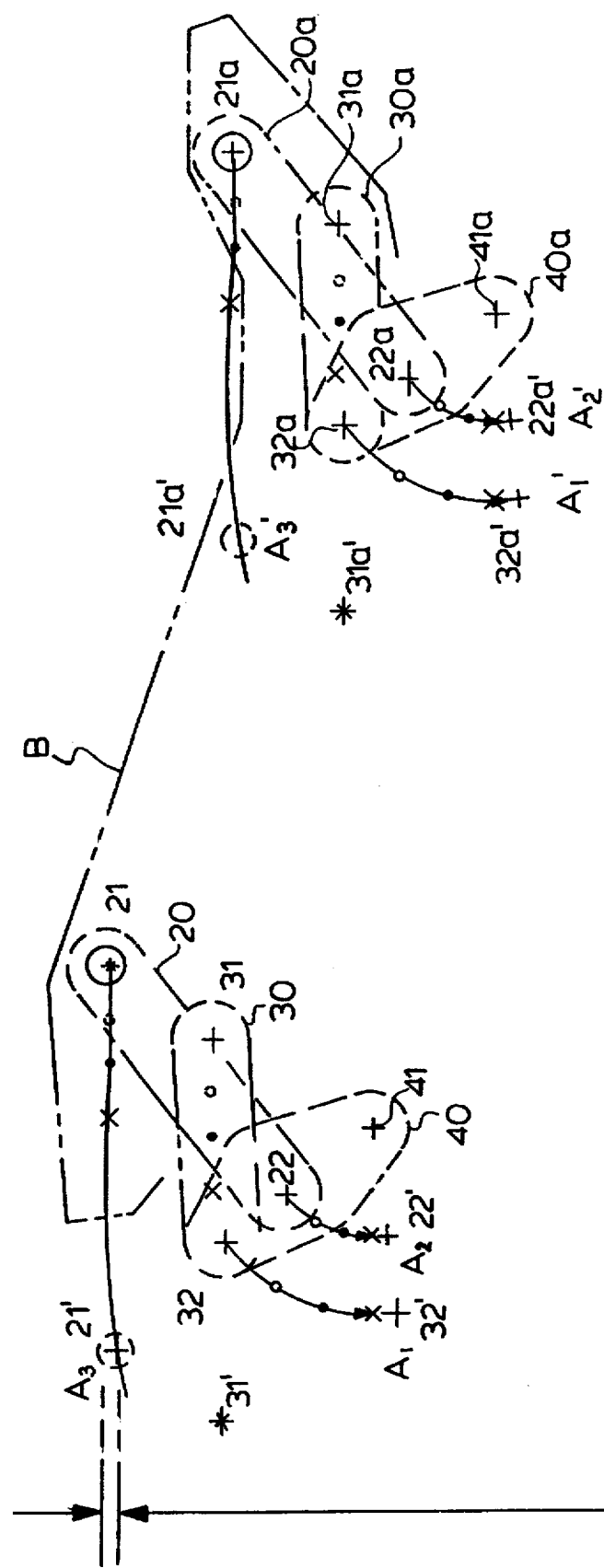
FIG. 6 is a schematic view of the operative positions of the seat of FIG. 1 illustrated in a preferred embodiment of the invention.

The seat bracket and riser may be formed by conventional stamping techniques or the like, wherein the necessary features such as mounting opening for seat S2, the latch positions R1, R2 and R3, the slotted latch portions L1 and L2, and the openings for the pivots are provided. The supplementary portion B4 (as best seen in FIG. 7) of seat bracket B may be affixed with B by conventional methods such as welding, fastening or the like. The latch 50 is resiliently biased via spring 53 and operative via the handle H causing portion H1 of the handle extension to engage near end 51 of the latch 50 and thereby move the detent 52 out of openings B1, and R3 as illustrated and therefore allow motion of the seat in the forward direction F by the operator. As at this juncture the seat bracket B is free to move as urged by an occupant in relation to the stationary riser R, the pairs of links 20, 20a, 30, 30a and 40, 40a will pivot over described cooperative paths, as best seen in FIG. 6 which result in the movement of the seat S2 in relation to the floor C of FIG. 2 in a substantially linear path. In empirically optimizing the seat adjuster it has been determined that by tracking the movement of the ends of the top links 20 and 30 and providing the shape of compensating link 40 that the seat adjuster 10 will maintain the seat bracket B a substantially constant distance within the range of 2.65 mm during the for and aft, movement of the seat. This minimum variation is a direct result of the selection of the dimensions of the links. The largest range provide during the evaluation was 6.38 mm. The reading in FIG. 13 represents the optimum dimensions to date.

Figure 13:
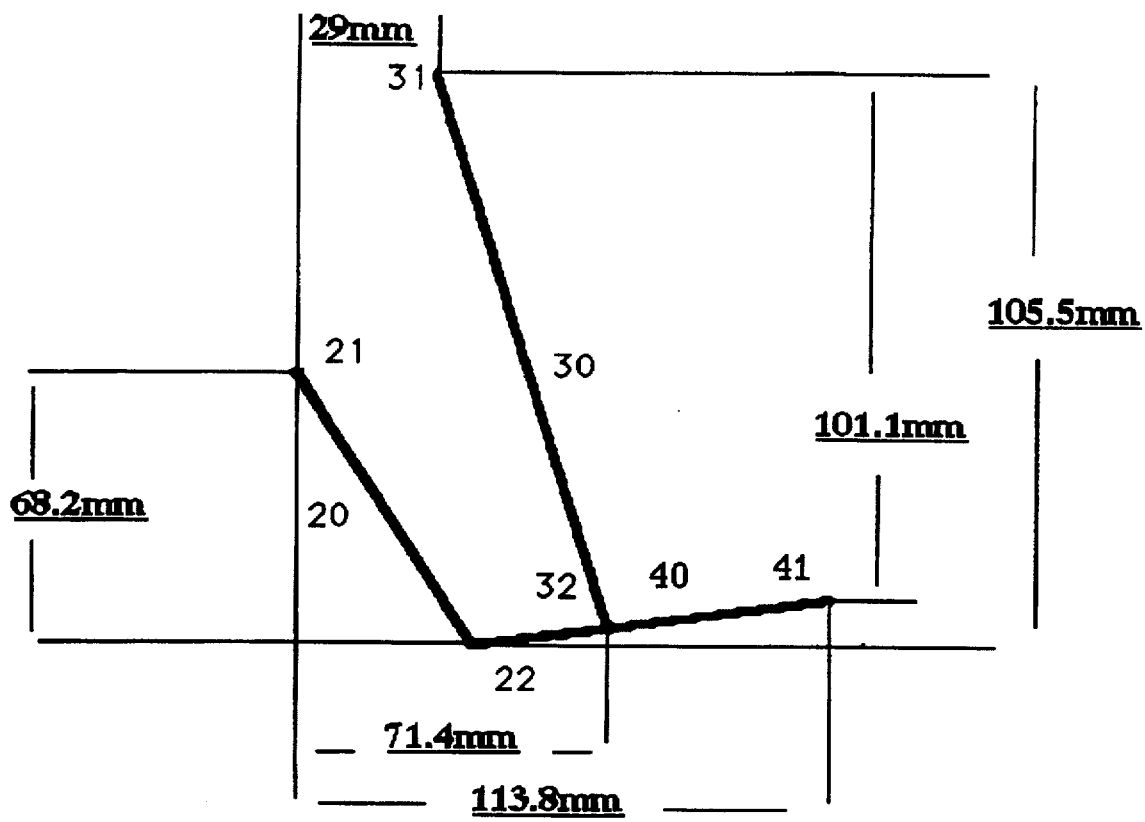
FIG. 13 is a chart showing the relationships of optimum dimensions of the links.

It is the charted relationships in FIG. 13 that results in the minimum 2.65 mm variation of the seat over its range of movement. The links 20, 30, and 40 are schematically illustrated to depict the distances between there pivots and there free ends. The exact dimensions therefor can be extrapolated by simple trigonometry. The amount of variation allowed therefore depends on the amount of headroom available to the occupant.

The resultant seat adjuster 10 has been found to be considerably lighter (34.2%) than conventional systems and thereby maximizes the weight to strength ratio. Further the links 20 and 30 may be ribbed along there lengths to improve the strength thereof. Link 40 is illustrated as wider than 20 or 30 since it carries the total loading of the system, the center cross section has been increased as it requires extra strength at this juncture than over the rest of its length.

Referring now to FIGS. 3 and 6 there is schematically illustrated the compensating effect that compensating link 40 has on the movement of the overall seat adjuster 10. For example the top ends 21 and 31 of the two links 20 and 30 in use would move in an arcuate upward and forward motion during the forward motion of the seat S2, and in an arcuate downward and rearward motion during the rearward movement of the seat S2. To compensate for this arcuate motion, which would alter the head room of an occupant if uncompensated for as the seat S2 is moved within its range of longitudinal motion, the two compensating links 40 and 40a move in a downward and forward compensating arcuate motion during the forward movement of the seat S2 and in an upward and rearward compensating arcuate motion during the rearward movement of the seat S2 thereby compensating for the motion of the two links 20 and 30 and rendering the motion of the seat bracket B in relation to the riser R by maintaining the seat bracket B in a substantially constant parallel position with respect to the riser R throughout the range of movement of said seat bracket B so that there is no appreciable arcuate movement thereof but a substantially linear movement of said seat bracket B in relation to the riser R. As can be observed in relation to FIGS. 3 and 6 ends 22 and 22a of links 20 and 20a move along the arcuate paths A2 and A2' as the compensating links 40 and 40a pivot upon their pivots 41 and 41a attached with the riser R. Similarly ends 32 and 32a of links 30 and 30a move along the arcuate paths A1 and A1' as the compensating links 40 and 40a pivot upon their pivots 41 and 41a attached with the riser R. The resultant effect upon the ends 21, 21a and 31 and 31a is a compensation of their known arcuate movements resulting in them adopting the positions 21', 21a', 31' and 31a' which are disposed a maximum of 2.65 mm from a perfect horizontal line extending through points 21, 21a, 31, and 31a respectively. Therefore the motion of the seat S2 attached to the seat bracket B in relation to the stationary riser R may be said to be substantially linear within the range of motion of the seat.

Referring now to FIGS. 2, 4, and 7, (illustrated in close-up front plan view) the assembly for the latch 50 which is fixed with the bracket B via portion 51H as illustrated. The pawl is resiliently biased by spring 53 fixed at end 54 with the bracket portion B3. Movement therefore of the handle H and hence portion H1 moves the pawl 50a laterally away from the openings B1 and R1 allowing end 52 to clear the openings and allow unencumbered movement of the seat bracket B in relation to the riser R as can be seen in FIG. 7 seat bracket B includes portions B2 and B4 which surround the top of the riser RT which assists in the lateral and longitudinal tracking of the seat bracket B in relation to the riser R and minimizes any play in the seat adjuster. Also it is recommended that the compensating link be pivoted from the riser rather than reversing the assembly as illustrated since and pivoting the compensating link from the seat bracket and the other two links from the riser since more play is introduced into the system which must be compensated for.

Those skilled in the art will appreciate that many modifications can be made to the seat adjuster described herein. Any system of linkages used as a seat adjuster utilizing the aspect of a compensating member which compensates for the arcuate motion of the system if left uncompensated would fall within the scope of this invention.

In order to meet the FMVSS 207 and 210 and surpass the standards it is been founded by Applicant that it is preferred to provide interlocking portions between the seat bracket and the riser which interlock and thereby provide a direct load path from the seat frame to the attachment bolts of the seat system as best seen in FIG. 2 at P3 and P4.

It is been found in a preferred embodiment when using 3 mm thick sheet metal to manufacture the brackets from a stamping process and 5 mm thick links and 16 mm diameter pins, that in subjecting that seat system to the test required by FMVSS 207 and 210 or the like or to the standards of a motor vehicle manufacturer which normally surpass the aforementioned federal standards, that a total force combined pull of 20,000 pounds is subjected upon the seat system. This assumes that the seat system is for a three passenger seat such as that found within a mini van. The details of these tests are found in the standards and the reader is referred to these standards for more detailed information in the manner which these tests are performed. Further with regard to the seatbelts the diagrams in the standards clearly point out the directions, magnitude, and angles of the forces. The teachings of these two standards are hereby incorporated by reference in relation to the manner in which the test are established.

As described in the background of the invention it has been determined that when testing to surpass such loading it is preferred to provide a load path directly from the seat frame to the attachment bolts P3 and P4. To do so an interlocking system has been invented so as to ensure that the load will pass to P3 and P4 when the latching mechanisms are founded in the position R2 and R3 as seen in FIG. 8.

In providing this interlocking feature the structure at 100% of the required FMVSS loading for code standards 207 and 210 resulted in no significant deformation to the system. In fact with the new interlocking portions testing was conducted up to 40% above the loading required by the FMVSS standards. It is estimated this will result in an 30% improvement in the overall safety of the seat system in a vehicle.

Figure 9:
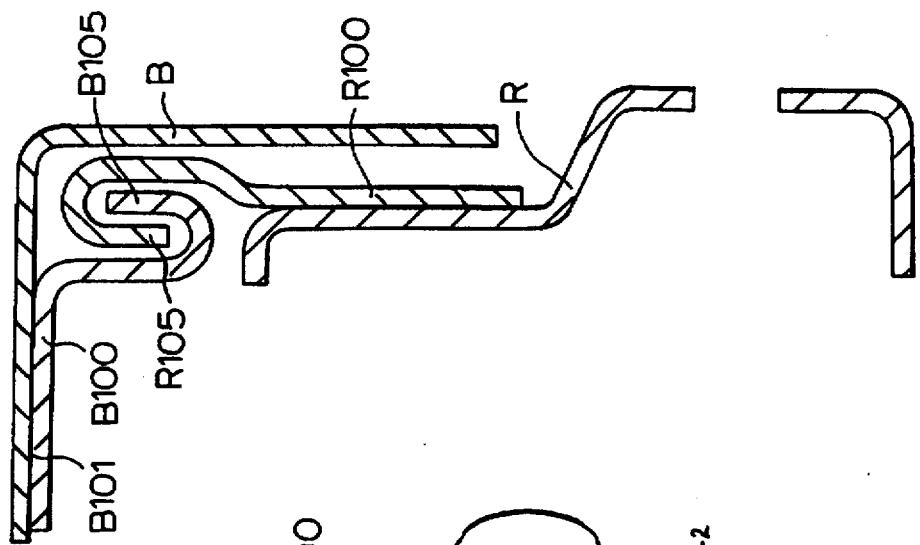
FIG. 9 is a cross sectional view of the seat bracket B and the riser R of FIG. 8 through the line AA illustrating the interlock feature of the seat bracket and riser and the operation thereof illustrated in a preferred embodiment of the invention.
Figure 8:
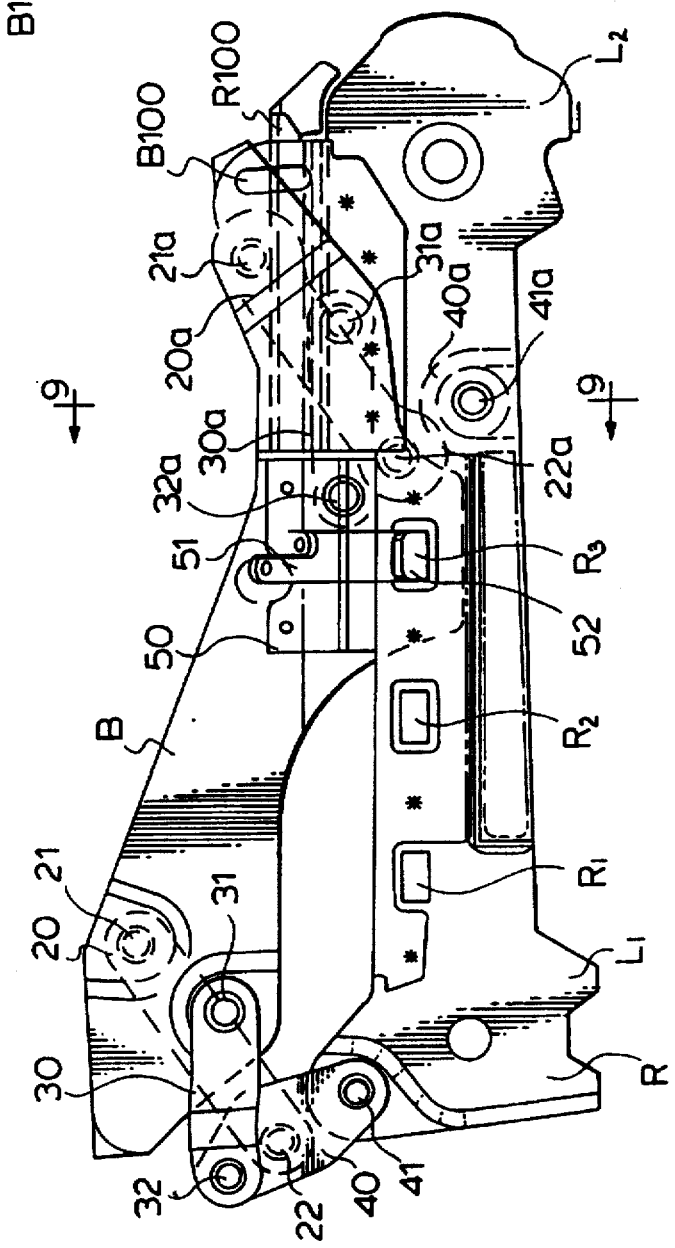
FIG. 8 is a similar view to that of FIG. 2 which illustrates in a preferred embodiment of the invention the interlocking portions B100 and R100 disposed proximate the rear of the seat system.

Referring now to FIG. 8 there is found a view identical to that of FIG. 2 with the exception that the seat system including the riser and the seat bracket incorporates proximate the rear thereof interlocking portions B100 with respect to the seat bracket B and R100 with respect to the riser R. All other descriptions of the components of FIG. 8 remain identical. The interlocking portions B100 and R100 interlock as best seen in FIG. 9 within the range of motion between positions R2 and R3. However in another embodiment the interlocking portions B100 and R100 may be extended so as to provide interlocking through the full range of motion R1, R2 and R3 of the seat assembly. This was not done in this example since the links 20, 30 and 40 extend substantially in a straight line and become reinforcing members themselves when the seat mechanism is adjusted to the position R1. However extending the interlock to the position R1 would be advantageous over the present described embodiment. To do so would merely require additional material and the description provided more than adequately describes the advantages of the system.

Referring now to FIG. 9 there is illustrated in cross section the riser R having the interlocking portion R100 welded thereto or otherwise fastened proximate the top thereof at R100. A substantially U shaped channel portion R105 is therefore provided proximate the top of portion R100. Further the seat bracket B includes a supplementary interlocking portion B100 welded thereto at B101 which includes a substantially U shaped interlocking portion B105 which rides within the opening provided by the substantially U shaped interlocking portion R105 of the riser R. Therefore as can be seen both portions B105 and R105 ride within the complementary U shaped channels provided by the other portions until such time a loading is exerted upon the system wherein the interlocking portions B105 and R105 will engage proximate the adjacent edges thereof and the ends thereof and will provide a direct path for the load to extend to the pins P3 and P4 as best seen in FIG. 2. As best seen in FIGS. 10 and 11 the interlocking portions in this embodiment only exist between the positions R2 and R3 of the seat assembly.

Referring now to FIG. 10 there is illustrated in schematic form the seat bracket B having the interlocking component B100 provided therewith which component includes the substantially hooked shape portion B105 and reinforcing rib B107 located proximate the rear thereof to increase the bending stiffness near the rear of the seat bracket B when subjected to a load, since this position is the portion of highest loading for the seat system.

Referring now to FIG. 11 there is provided with riser R having operating position R1, R2 and R3 the interlocking portion R100 which includes the hooked shaped portion R105 and the reinforcing portion R107 provided for the same reason as that stated in relation to B107 of FIG. 10. The distance D2 over which the portion R100 extends cooperates with the distance D1 of FIG. 10 for portion B100 so that the portions interlock over the same distance of adjustment.

Referring now to FIG. 12 there is a illustrated a closer perspective view of the portion R100 and R107 specifically of the riser portion R. The portion R107, as indicated in relation to the ribs B107 represents the point of highest loading for the seat system and therefore this portion R107 represents a portion of the hook portion R105 of FIG. 9 which is further extended proximate the end of the seat riser R which is turned over upon itself and welded to the riser R at R108 so as to reinforce the interlocking portion R105 of the riser portion R100.

These additions described in a relations to FIG. 8 through 12 complement the seat structure of FIGS. 1 through 7 by providing interlocking portions B105 and R105 which interlock when subjected to the loading normally experienced during an incident with a vehicle. Such interlocking portions therefore create a direct load path for the passage of forces through to the pins P2 and P4 in a seat system. In doing so considerably less forces are exerted on the links 20, 30 and 40 and 20a, 30a and 40a of the seat mechanism as well as the adjuster mechanism 50.

As many changes can be made to the preferred embodiments of the invention without departing from the scope of the invention; it is intended that all material contained herein be interpreted as illustrative of the invention and not in a limiting sense.

The embodiments of the invention in which an exclusive property or privilege is claimed are as follows:

1. A seat system comprising a vehicle frame and a seat bracket moveably affixed in relation to said frame, the seat system having means to move the seat bracket to and from a fore and aft position longitudinally in relation to said frame, wherein said means to move the seat bracket to and from a fore and aft position longitudinally further comprises a linkage system for providing the longitudinal movement of the seat bracket including at least two links for moving the seat bracket fore and aft and at least one compensating means for compensating for the substantially arcuate motion of the at least two links of the linkage system of the seat bracket, the cooperative motion of the at least one compensating means rendering the movement of the linkage system and the seat bracket as substantially linear within the range of movement of the seat bracket, the frame having first interlocking means to interlock with interlocking means of the seat bracket over the longitudinal motion of the seat bracket, the seat bracket having second interlocking means to interlock with interlocking means of the frame over the longitudinal motion of the seat bracket, wherein the first and second interlocking means normally permit said longitudinal motion but are arranged to interlock when the system is subjected to the loading experienced during an accident to provide a direct path to the vehicle frame for any forces exerted upon the seat system during an accident while reducing any forces exerted on the means to move the seat bracket to and from a fore and aft position in relation to the frame, during the accident.

2. A seat system comprising a riser attached to a vehicle frame and a seat bracket moveably affixed in relation to said riser, the seat system having means to move the seat bracket to and from a fore and aft position longitudinally in relation to said riser, wherein said means to move the seat bracket to and from a fore and aft position longitudinally further comprises a linkage system for providing the longitudinal movement of the seat bracket including at least two links for moving the seat bracket fore and aft and at least one compensating means for compensating for the substantially arcuate motion of the at least two links of the linkage system of the seat bracket, the cooperative motion of the at least one compensating means rendering the movement of the linkage system and the seat bracket as substantially linear within the range of movement of the seat bracket, the riser having first interlocking means to interlock with interlocking means of the seat bracket over the longitudinal motion of the seat bracket, the seat bracket having second interlocking means to interlock with interlocking means of the riser over the longitudinal motion of the seat bracket, wherein the first and second interlocking means normally permit said longitudinal motion but are arranged to interlock when the system is subjected to the loading experienced during an accident to provide a direct path to the vehicle frame for any forces exerted upon the seat system during an accident while reducing any forces exerted on the means to move the seat bracket to and from a fore and aft position in relation to the riser, during the accident.

3. The seat system of claim 1 or 2 wherein the at least two links in use move in an arcuate upward and forward motion during the forward motion of the seat bracket, and in an arcuate downward and rearward motion during the rearward movement of the seat bracket and to compensate for this arcuate motion, which would alter the head room of an occupant if uncompensated for as the seat bracket is moved within its range of longitudinal motion, the compensating means being a link moves in a downward and forward compensating arcuate motion during the forward movement of the seat bracket and in an upward and rearward compensating arcuate motion during the rearward movement of the seat bracket thereby compensating for the motion of the at least two links and rendering the motion of the seat bracket by maintaining the seat bracket in a substantially constant parallel position with respect to the frame throughout the range of movement of said seat bracket so that there is no appreciable arcuate movement but a substantially linear movement of said seat bracket in relation to the frame.

4. A system for providing linear movement of a vehicle seat comprising a seat bracket, having a seat disposed therewith in use, and a riser, each of the seat bracket and the riser having a front and rear, top and bottom; the seat bracket being located substantially on top of said riser in use; at least two first links pivotally engaged with said seat bracket at a pivot, one of said at least two first links being connected proximate the front of the seat bracket and the other of said at least two first links being connected proximate the rear of said seat bracket; at least two second longer links, being longer than said first links, and pivotally engaged with said seat bracket at a pivot, one of said at least two second links being pivotally connected proximate the front of said seat bracket but offset towards the rear and towards the top of the seat bracket in relation to the pivot of the first link, and the other of said at least two second links being pivotally connected proximate the rear of said seat bracket but offset towards the front and towards the top of the seat bracket in relation to the pivot of the first link, said at least two first and second links being pivotally interconnected with at least two compensating third links having a free end and being pivotably connected with the front and rear of the riser, the at least two first links being interconnected with the at least two compensating third links proximate the free end of the at least two compensating third links respectively, the at least two second links being interconnected with the at least two compensating third links intermediate the free end of the at least two compensating third links and pivoting ends of the at least two compensating third links connected with the riser respectively, the at least two first and second links providing the longitudinal fore and aft motion of seat bracket in relation to the riser, the at least two compensating third links compensating for the arcuate motion of the at least two first and second links maintaining the seat bracket in a substantially constant parallel position with respect to the riser throughout the range of movement of said seat bracket so that there is no appreciable arcuate movement but a substantially linear movement of said seat bracket in relation to the riser, the riser having first interlocking means to interlock with interlocking means of the seat bracket over the longitudinal motion of the seat bracket, the seat bracket having second interlocking means to interlock with interlocking means of the riser over the longitudinal motion of the seat bracket, wherein the first and second interlocking means normally permit said longitudinal motion but are arranged to interlock when the system is subjected to the loading experienced during an accident to provide a direct path to the vehicle frame for any forces exerted upon the seat system during an accident while reducing any forces exerted on said first, second, and compensating links during the accident.

5. The system of claim 4 wherein the pivot of the at least two first links and the pivot of the at least two second links in use move in an arcuate upward and forward motion during the forward motion of the seat, and in an arcuate downward and rearward motion during the rearward movement of the seat; to compensate for this arcuate motion, which would alter the head room of an occupant if uncompensated for as the seat is moved within its range of longitudinal motion, the at least two compensating third links move in a downward and forward compensating arcuate motion during the forward movement of the seat and in an upward and rearward compensating arcuate motion during the rearward movement of the seat thereby compensating for the motion of the at least two first and second links and rendering the motion of the seat bracket in relation to the frame by maintaining the seat bracket in a substantially constant parallel position with respect to the riser throughout the range of movement of said seat bracket so that there is no appreciable arcuate movement but a substantially linear movement of said seat bracket in relation to the riser.

6. The system of claim 4 or 5 wherein the riser further comprises integral detent portions disposed proximate the top thereof to fasten the seat bracket in relation to the riser at various detent positions in relation thereto, the seat bracket including latching means which releasably engages latching portions of the riser as the seat is moved to and from alternative comfort positions.

7. The system of claim 6 wherein the seat bracket and or the riser further comprises portions disposed proximate the bottom of the seat bracket and or the top of the riser which engages with one another and provide resistance to lateral forces tending to move the bracket laterally in relation to the riser and assist in guiding the bracket in relation to the riser longitudinally.

8. The system of claim 7 wherein the portions are downwardly extending flanges of the seat bracket which surround the top of the riser and further assist in guiding the longitudinal motion of the seat bracket in relation to the riser.

9. The system of claim 8 wherein the latching means when latched simultaneously extends through openings in the riser and an aligned opening extending through the seat bracket.

10. The system of any of claims 3 or 4 wherein the riser further comprises integral latching portions proximate the bottom thereof to fasten the riser, the seat bracket and the seat in use to floor latching portions.

* * * * *